Aug. 12, 1947. C. A. DE GIERS ET AL 2,425,366
POINTER RETURN DEVICE
Filed July 8, 1946 2 Sheets-Sheet 1

INVENTORS
CLARENCE A. DE GIERS
ABRAHAM EDELMAN
BY
Ernest D. Given
ATTORNEY

Aug. 12, 1947.   C. A. DE GIERS ET AL   2,425,366
POINTER RETURN DEVICE
Filed July 8, 1946   2 Sheets-Sheet 2

INVENTOR.
CLARENCE A. DE GIERS
BY ABRAHAM EDELMAN
Ernest D. Given
ATTORNEY

Patented Aug. 12, 1947

2,425,366

UNITED STATES PATENT OFFICE 2,425,366

POINTER RETURN DEVICE

Clarence A. de Giers, Forest Hills, and Abraham Edelman, New York, N. Y., assignors to The Liquidometer Corporation, Long Island City, N. Y., a corporation of Delaware Application July 8, 1946, Serial No. 681,796

7 Claims. (Cl. 177—351)

1

This invention relates to measuring and/or control devices of the type comprising a magnet rotor, the position of which is controlled by control means which in turn are controlled by any suitable means such as a variable physical magnitude. The control means controlling the rotor position may be constituted by a plurality of deflecting coils positioned about the rotor and connected to be differentially energized, the differential energization of the deflecting coils being controlled by the variable physical magnitude to be supervised. The coaction between the rotor and the field set up by the deflecting coils will then place the rotor in a definite angular position corresponding to the differential energization of the deflecting coils. The angular rotor position can be indicated by means of a pointer and a scale or be employed to operate a control member. However, it should be understood that the invention is applicable also to instruments in which the rotor movements are the result of small movements of adjacent permanent magnets (magnetometers), and also to instruments employing deflecting coils energized by A.-C. and including an iron rotor which is magnetized temporarily by a coil during each cycle of the alternating current.

In instruments of the types above described and in similar instruments it is frequently necessary or desirable to provide a means for causing the rotor assembly to assume a definite or zero position such as an "off" position in case of a pointer indicating instrument, when the instrument is not energized for indication or control. It will be apparent that without such zero return means the rotor assembly will come to rest in any odd position which may then be interpreted as indicative of a certain value of a physical magnitude or other force controlling the rotor position if it were not known or disregarded that the instrument is not in operation for indication or control.

Such rotor return devices, as known in the art, generally consist of a stationary permanent magnet placed closely adjacent to the rotor assembly. The magnetic fields of the return magnet and of the rotor then coact in such manner that the pole of the return magnet close to the rotor will attract the pole of the rotor having opposite polarity. As a result of such mutual polar attraction, the rotor will be turned into a definite position relative to the position of the return magnet. The position of the stationary return magnet is selected so that the angular position in which the rotor is placed thereby, is the desired off-scale position of the rotor.

As it will be obvious from the previous explanations, the return magnet, being a permanent magnet, will exert its influence upon the rotor position not only when the instrument is not in

2 operation and when it is desirable to return the rotor into the zero position but also when the instrument is energized for indication or control. As a result, the rotor position during the operation of the instrument is a function not only of the control means but also of the field of the return magnet. Consequently, the rotor position does not correctly reflect the variable physical magnitude or other force controlling the said control means. In other words, the indications or control actions of the instrument will be not quite accurate.

One object of the invention is a novel and improved rotor return device which will place the rotor in a predetermined neutral position when the instrument is not operating.

Another object of the invention is a novel and improved return device which will return the rotor into a predetermined neutral or zero position when the instrument is not in operation but will not affect the rotor position to any appreciable extent when the instrument is in operation so that the rotor position is always a true function of the magnitude controlling the rotor position.

Another object of the invention is a novel and improved return device which is insensitive to voltage changes of the electrical supply feeding the circuit of the measuring and control device.

According to a now preferred embodiment of the invention the above enumerated and other objects of the invention are attained by a balancing coil energized by a constant current supply for setting up a field which substantially balances the magnetic field of the return magnet during the operation of the measuring and control device.

Other and further objects, features and advantages of the invention will appear hereinafter and in the appended claims forming part of the application.

This application discloses subject matter in part disclosed in the application of L. M. Campani and Carl Geiser, Serial Number 676,166, filed June 12, 1946.

In the accompanying drawings several embodiments of the invention are shown by way of illustration and not by way of limitation.

Figure 1:
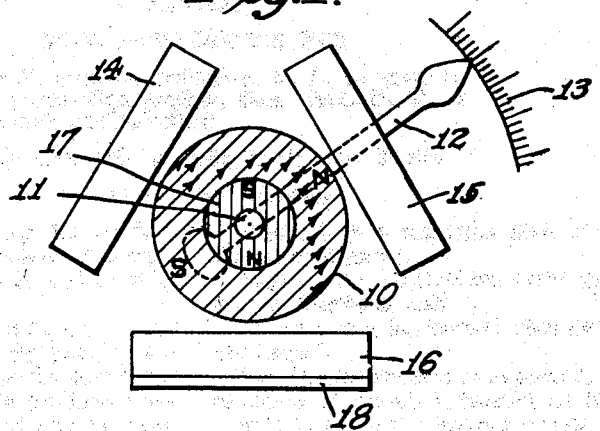
Fig. 1 is a diagrammatic plan view of an instrument of the ratiometer type equipped with a rotor return device according to the invention.

Referring now to the drawings in detail, the ratiometer shown in Fig. 1 comprises a cylindrical permanent magnet rotor 10 supported on sleeve or pivot bearings at opposite ends of a shaft 11. The poles of the rotor are marked by letters "N" and "S," the shading indicating the approximate lines of magnetization. A pointer 12 is also supported on shaft 11 or on the rotor body itself and cooperates with a stationary scale 13 to indicate the angular position of the rotor. The scale may be calibrated in units of a variable physical magnitude to be supervised, for instance, in gallons or pounds of fuel. Three deflecting coils 14, 15 and 16 are stationarily mounted about the rotor assembly, uniformly spaced. The deflecting coils are connected to be differentially energized and are employed for turning the rotor assembly and hence the pointer into the desired position, the differential energization of the coils being controlled by the variable physical magnitude to be supervised as will be more fully explained hereinafter. A permanent stationary magnet 17 is mounted in a suitable position relative to the rotor, preferably concentric with the rotor axis opposite to the top or bottom side of the rotor. The poles of magnet 17 are marked by letters "N" and "S," the shading indicating the approximate lines of magnetization. This stationary magnet serves as a return magnet, and it will be obvious that the return magnet always urges the rotor into a position in which opposite poles are in alignment. This position is so selected that it constitutes the desired off-scale position of pointer 12.

As previously explained, the permanent return magnet will exert its influence continuously, that is also during measuring when such influence is undesirable. According to the invention, this undesirable influence of the return magnet is eliminated by the provision of a balancing coil 18. This coil is shown in Fig. 1 as being structurally combined with coil 16. However, it should be understood that the coil can also be mounted in any other suitable position. It is only essential that the balancing coil is positioned in relation to the return magnet in such a manner that it interacts with the magnet rotor similarly as the return magnet interacts with the magnet rotor but opposite in direction. Then, if a steady current of proper polarity and magnitude is passed through the balancing coil the flux therefrom will substantially balance the flux from the pointer return magnet insofar as the influence of the latter upon the magnet rotor is concerned. As a result, the return magnet may be made effective, or non-effective at will, merely by switching the current through the balancing coil off or on respectively.

Figure 2:
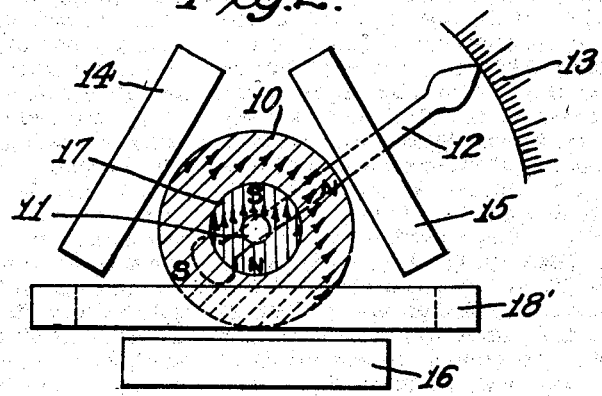
Fig. 2 shows a modification of the rotor return device in conjunction with the same ratiometer as has been illustrated in Fig. 1.

Fig. 2 shows a modification which is similar to the embodiment of the invention shown in Fig. 1 as to the arrangement of the ratiometer itself and the pointer return magnet. The modification according to Fig. 2 is distinguished from Fig. 1 by the arrangement of the balancing coil. Fig. 2 shows a balancing coil 18' which is mounted separately from coil 16. As will be seen from Fig. 2 the axis of the coil coincides with a radial line perpendicularly extended from the rotor shaft and also is parallel to the line connecting the poles of the return magnet. The diameter of the coil is so selected that the coil extends above and below the top and the bottom of the rotor. Practical tests have shown that under certain conditions such enlarged coil is advantageous.

Figure 3:
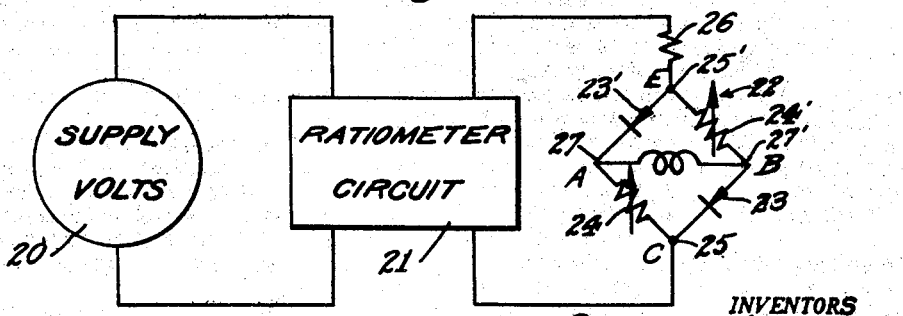
Fig. 3 is a circuit diagram showing a voltage regulator for a rotor return device according to the invention.

Fig. 3 shows a typical circuit diagram to which the invention is applicable. A source of electricity 20 supplies a measuring and control device such as shown in Figs. 1 and 2 and the control therefor. The device and its control circuit are indicated by a rectangle generally designated 21 and the legend "ratiometer circuit." The circuit may be a circuit well known as "D.-C. Selsyn circuit" or any other type of ratiometer circuit. The balancing coil 18 (or 18') is connected to the circuit through a voltage regulator network generally designated 22. This voltage regulator may be of any suitable type. Fig. 3 shows a regulator comprising two non-linear resistance elements 23, 23' such as selenium rectifier discs and two linear variable resistance elements 24, 24' connected into a bridge with like elements opposite each other. The bridge is supplied with direct current at opposite terminals 25, 25', preferably through a series resistor 26. The remaining two terminals 27, 27' of the bridge supply direct current to the balancing coil 18. The bridge is operated with a range of voltages so selected that it will regulate its output throughout the entire range of voltages. As a result, balancing coil 18 receives substantially constant current throughout the entire range of voltages received by the bridge at terminals 25, 25'. The voltage supplied to the bridge may come directly from the source of current 20 or from any available part of the ratiometer circuit generally designated 21. The current supplied to balancing coil 18 is adjusted, preferably by varying the resistance elements 24, 24' until the flux from coil 18 just balances the flux from the permanent return magnet 17 insofar as the influence of this magnet on rotor 10 is concerned.

The provision of a voltage regulator has the advantage that in spite of voltage variations of the supply 20 a constant current is supplied to balancing coil 18 so that this coil will continuously balance the influence of the return magnet on the rotor position, as long as coil 18 is energized.

The employment of a voltage regulator permits also deriving current for the balancing coil from a portion of the ratiometer circuit in which the available current may vary with the variations of the magnitude to be supervised.

Figure 4:
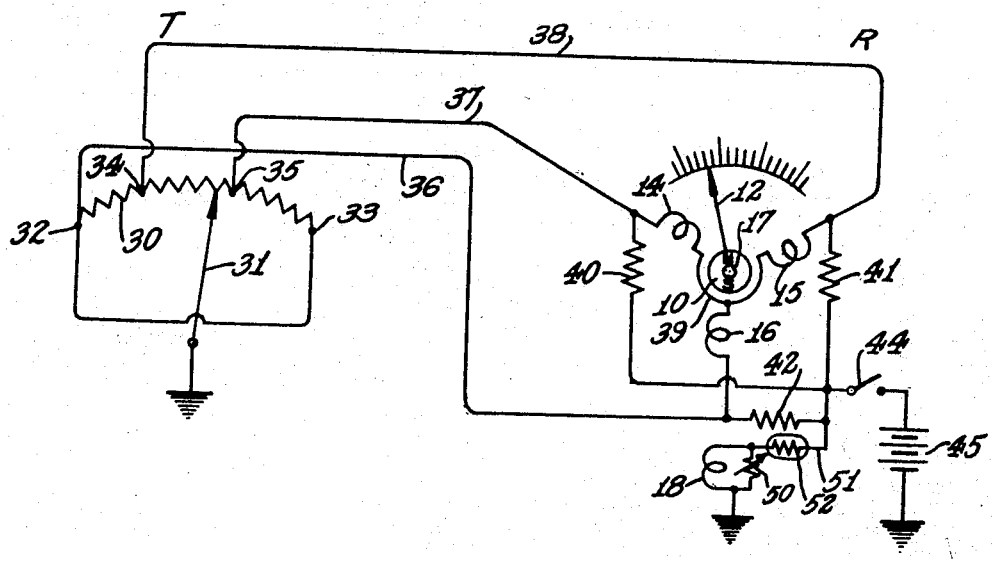
Fig. 4 shows a typical circuit diagram of a ratiometer equipped with a rotor return device according to the invention and of a transmitter controlling the ratiometer.

Fig. 4 shows a circuit diagram of this type. According to Fig. 4 a transmitter generally designated T controls a ratiometer generally designated R.

The transmitter may be of any suitable type. There is shown in Fig. 4 a conventional transmitter of the so-called "resistance type" comprising a resistance element 30 which is engaged by a grounded slider contact 31. The position of the slider contact relative to resistance element 30 is controlled by any suitable means, for instance, by a variable physical magnitude to be supervised, such as the level of liquid contained in a tank. Resistance element 30 is tapped at both ends 32, 33 respectively and at equally spaced intermediate points 34, 35. The end taps and the intermediate taps are connected by wires 36, 37 and 38 respectively, to one terminal of the ratiometer coils 14, 15 and 16, the other terminals of the ratiometer coils being joined by a common wire 39. The terminals of the ratiometer coils connected to wires 36, 37 and 38 are also connected to one terminal of resistors 40, 41, 42. The other terminals of the resistors are joined at point 43 and connected through a switch 44 to the plus terminal of a battery 45, the other terminal of the battery being grounded thereby closing the circuit to slide contact 31.

As will be apparent to any person skilled in the art, the position of slider 31 on resistance element 30 controls the distribution of current through the ratiometer coils and hence the angular position of rotor 10 and with it the position of pointer 12. Consequently, the position of pointer 12 will be a function of the position of slider 31 which in turn is controlled by the magnitude to be supervised. When the ratiometer is not measuring, that is, when switch 44 is open, return magnet 17 will return pointer 12 into its off-scale position. The balancing coil 18 (or 18') serving to balance the influence of return magnet 17 during operation is shunted by an adjustable resistor 50 which serves to adjust the flux from coil 18 until it just balances the flux from return magnet 17. In other words, the resistor 50 corresponds to resistance element 24, 24' of Fig. 3. Coil 18 and resistor 50 are grounded at one end and connected at the other end by a wire 51 and a resistor 52 to point 43. Resistor 52 is a resistor of a type compensating for voltage variations, thereby maintaining a constant current to coil 18. For instance, resistor 52 may consist of a constant-current filament made of iron wire in an atmosphere of hydrogen, whereby temperature and resistance of the filament change with the applied voltage. As will be evident, coil 18 is energized, thereby balancing the influence of return magnet 17 when switch 44 is closed and the system is in operation, and will be deenergized when switch 44 is open, thereby placing the rotor position under the sole control of return magnet 17.

Figure 5:
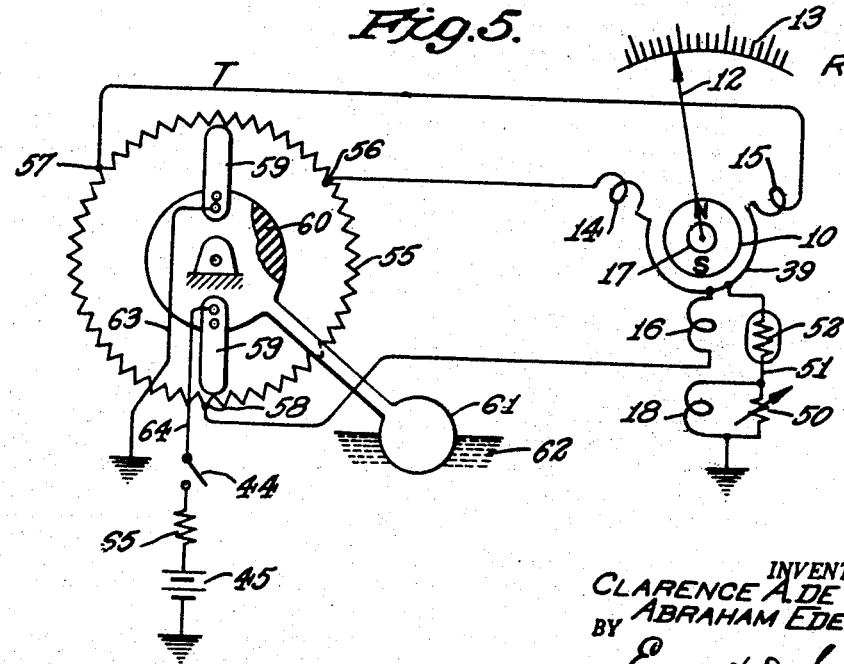
Fig. 5 shows a modified circuit diagram of a transmitter and a ratiometer equipped with a rotor return device according to the invention and controlled by the transmitter.

Fig. 5 shows a modification of the circuit system according to Fig. 4. The transmitter circuit system of Fig. 5 is connected with the ratiometer by a standard D.-C. Selsyn circuit. The transmitter comprises an annular resistance element 55 tapped at three equi-distant points 56, 57 and 58. These taps are connected to the outer terminals of ratiometer coils 14, 15 and 16. Resistance element 55 is slidably engaged by two diametrically opposite sliders 59 and 59' supported on a rotatably mounted insulation disc 60. The position of this disc and hence of sliders 59, 59' is controlled by the variable physical magnitude to be supervised. According to Fig. 5 the disc position is controlled by means of a float 61 floating on a varying liquid level 62 which may be the level of fuel in a tank. Slider 59 is grounded by a wire 63 and slider 59' is connected by a wire 64, switch 44 and a resistor 65 to the plus terminal of battery 45. As will be apparent to any person skilled in the art, the position of sliders 59, 59' relative to resistance element 55 will control the differential energization of the ratiometer coils and hence also the positions of the rotor 10 and pointer 12.

The circuit of the balancing coil 18 is the same as has been described in connection with Fig. 5 with the exception that wire 51 now connects the one terminal of resistor 52 to wire 39 joining the ratiometer coils.

As will be obvious from the previous explanations, coil 18 will balance the influence of return magnet 17 as long as switch 44 is closed and the system is in operation.

The modification according to Fig. 5 has the advantage that the number of wire connections between transmitter and ratiometer is reduced which is of importance when the transmitter is widely separated from the ratiometer.

As has been previously explained, the application of the invention is not limited to ratiometer circuits but the invention may be advantageously employed in all systems in which a return magnet is used to return a rotor into a neutral position when the instrument is not measuring.

While the invention has been described in detail with respect to certain preferred examples and embodiments, it will be understood by those skilled in the art after understanding the invention that various changes and modifications may be made without departing from the spirit and scope of the invention, and it is intended therefore, in the appended claims, to cover all such changes and modifications.

What is claimed is:

1. In a measuring and control device, in combination a magnet rotor, control means for controlling the angular position of said rotor, indicating and control means controlled by the rotor position, magnetic means constructed and positioned to urge the rotor into a predetermined angular position, a coil included in a circuit with a source of current and positioned to produce a field balancing the influence of the magnetic means on the rotor position, voltage regulating means connected with said circuit for supplying constant current to the balancing coil independently of voltage variations of the source of current, and means for deenergizing the balancing coil, when said control means is rendered inoperative for the purposes aforesaid, thereby controlling the rotor position by the magnetic means only.

2. In an electric measuring and control device, the combination of a magnetic rotor, a plurality of deflecting coils magnetically coacting with the rotor and connected to be differentially energized, a transmitter controlled by a change of a variable physical magnitude to be supervised included in a circuit with the deflecting coils and a source of current for controlling the differential energization of the deflecting coils, indicating and control means controlled by the rotor position, a stationary permanent magnet positioned to urge the rotor into a predetermined angular position, a balancing coil included in a second circuit connected to the first circuit and positioned to produce a field balancing the influence of the permanent magnet on the rotor position, voltage regulating means included in the second circuit for supplying constant current to the balancing coil independently of voltage variations of said source of current, and means for deenergizing said balancing coil and said deflecting coils, thereby controlling the rotor position by the magnetic field of the permanent magnet only.

3. In a measuring and control device, in combination a rotatably supported magnet rotor, electric control means for controlling the angular position of said rotor, indicating and control means controlled by the rotor position, permanent magnet means constructed and positioned to urge the rotor into a predetermined angular position, a coil included in an energizing circuit for producing a field balancing the influence of the magnet means on the rotor position, the axis of said coil being positioned to substantially coincide with a radial line perpendicularly extended from the rotor axis and substantially parallel to the line connecting the poles of the magnet means, and means for deenergizing said coil, when said control means is rendered inoperative for the purposes aforesaid, thereby controlling the rotor position by the magnet means only.

4. In an electric measuring and control device, the combination of a magnet rotor, a plurality of deflecting coils magnetically coacting with the rotor and connected to be differentially energized, a transmitter controlled by a change of a variable physical magnitude to be supervised included in a circuit with the deflecting coils and a source of current for controlling the differential energization of the deflecting coils, indicating and control means controlled by the rotor position, a stationary permanent magnet positioned to urge the rotor into a predetermined angular position, a balancing coil included in a second circuit connected to the first circuit, and positioned to produce a field balancing the influence of the permanent magnet on the rotor position, the axis of the said coil being positioned to substantially coincide with a radial line perpendicularly extended from the rotor axis and substantially parallel to the line connecting the poles of the permanent magnet, and means for deenergizing said balancing coil and said deflecting coils, thereby controlling the rotor position by the magnetic field of the permanent magnet only.

5. In an electric measuring and control device, the combination of a magnet rotor, a plurality of deflecting coils magnetically coacting with the rotor and connected to be differentially energized, a transmitter controlled by a change of a variable physical magnitude to be supervised included in a circuit with the deflecting coils and a source of current for controlling the differential energization of the deflecting coils, indicating and control means controlled by the rotor position, a stationary permanent magnet positioned to urge the rotor into a predetermined angular position, a balancing coil included in a second circuit connected to the first circuit, and positioned to produce a field balancing the influence of the permanent magnet on the rotor position, the axis of the said coil being positioned to substantially coincide with a radial line perpendicularly extended from the rotor axis and substantially parallel to the line connecting the poles of the permanent magnet, said balancing coil being structurally combined with one of the deflecting coils, and means for deenergizing said balancing coil and said deflecting coils, thereby controlling the rotor position by the magnetic field of the permanent magnet only.

6. In an electric measuring and control device, the combination of a magnet rotor, a plurality of deflecting coils magnetically coacting with the rotor and connected to be differentially energized, a transmitter controlled by a change of a variable physical magnitude to be supervised included in a circuit with the deflecting coils and a source of current for controlling the differential energization of the deflecting coils, indicating and control means controlled by the rotor position, a stationary permanent magnet positioned to urge the rotor into a predetermined angular position, a balancing coil included in a second circuit connected to the first circuit, and positioned to produce a field balancing the influence of the permanent magnet on the rotor position, the axis of the said coil being positioned to substantially coincide with a radial line perpendicularly extended from the rotor axis and substantially parallel to the line connecting the poles of the permanent magnet, said balancing coil being mounted closely adjacent to one of the deflecting coils and having a diameter extending above and below the top and the bottom of said rotor, and means for deenergizing said balancing coil and said deflecting coils, thereby controlling the rotor position by the magnetic field of the permanent magnet only.

7. In an electric measuring and control device, the combination of a magnet rotor, a plurality of deflecting coils magnetically coacting with the rotor and connected to be differentially energized, a transmitter controlled by a change of a variable physical magnitude to be supervised included in a circuit with the deflecting coils and a source of current for controlling the differential energization of the deflecting coils, indicating and control means controlled by the rotor position, a stationary permanent magnet positioned to urge the rotor into a predetermined angular position, a balancing coil included in a second circuit connected to the first circuit, and positioned to produce a field balancing the influence of the permanent magnet on the rotor position, the axis of the said coil being positioned to substantially coincide with a radial line perpendicularly extended from the rotor axis and substantially parallel to the line connecting the poles of the permanent magnet, voltage regulating means included in the second circuit for supplying constant current to the balancing coil independently of voltage variations of said source of current, and means for deenergizing said balancing coil and said deflecting coils, thereby controlling the rotor position by the magnetic field of the permanent magnet only.

CLARENCE A. DE GIERS.
ABRAHAM EDELMAN.